(12) United States Patent
Zhu et al.

(10) Patent No.: US 7,406,176 B2
(45) Date of Patent: Jul. 29, 2008

(54) FULLY SCALABLE ENCRYPTION FOR SCALABLE MULTIMEDIA

(75) Inventors: Bin Zhu, Edina, MN (US); Shipeng Li, Redmond, WA (US); Chun Yuan, Beijing (CN); Yidong Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 10/405,970

(22) Filed: Apr. 1, 2003

(65) Prior Publication Data

US 2004/0196975 A1    Oct. 7, 2004

(51) Int. Cl.
*H04N 7/167* (2006.01)

(52) U.S. Cl. .................. 380/200; 380/243; 713/176; 705/57; 705/58; 705/59

(58) Field of Classification Search ........................ None
See application file for complete search history.

(56) References Cited

U.S. PATENT DOCUMENTS

| | | | |
|---|---|---|---|
| 6,006,283 A * | 12/1999 | Hsieh et al. ............. | 710/9 |
| 6,128,737 A | 10/2000 | Jakubowski et al. | |
| 6,182,214 B1 | 1/2001 | Hardjono | |
| 6,351,491 B1 | 2/2002 | Lee et al. | |
| 6,392,705 B1 | 5/2002 | Chaddha | |
| 7,072,366 B2 * | 7/2006 | Parkkinen et al. ......... | 370/538 |
| 7,167,560 B2 * | 1/2007 | Yu ......................... | 380/200 |
| 2003/0021296 A1 | 1/2003 | Wee et al. | |

FOREIGN PATENT DOCUMENTS

| | | |
|---|---|---|
| EP | 0766471 | 4/1997 |
| EP | 1189432 | 3/2002 |
| EP | 1271280 | 1/2003 |
| JP | 2002 87628 | 4/2002 |

OTHER PUBLICATIONS

C Shi et al.; "An Efficient MPEG Video Encryption Algorithm" Proceedings of the 17th IEEE Symposium on Reliable Distributed Systems. SRDS 98. West Lafayette IN Oct. 20-23.
S. J. Wee et al.; "Secure scalable streaming enabling transcoding without decryption" Proceedings 2001 International Conference on Image Processing. ICIP 2001 Thessaloniki Greece Oct. 7-10, 2001; IEEE vol. 1 of 3. Conf 8 Oct. 7, 2001 pp. 437-440.
Wu, et al., "A Framework for Efficient Progressive Fine Granularity Scalable Video Coding", IEEE Trans. on Circuits and Systems for Video Technology, vol. 11, No. 3, pp. 332-344, 2001.

(Continued)

*Primary Examiner*—Kambiz Zand
*Assistant Examiner*—Roderick Tolentino
(74) *Attorney, Agent, or Firm*—Lee & Hayes, PLLC

(57) ABSTRACT

Subject matter includes exemplary systems and related methods for fully scalable encryption of scalable multimedia. A scalable bitstream encrypted using the subject matter maintains full functionality of scalable features in the encrypted form. The exemplary scalable encryption allows transcoding, rate shaping, and other operations directly on the ciphertext without degradation of scalable compression efficiency and error resiliency.

41 Claims, 7 Drawing Sheets

OTHER PUBLICATIONS

Sun, et al., "Macroblock-Based Progressive Fine Granularity Scalable (PFGS) Video Coding With Flexible Temporal-SNR Scalabilities"; IEEE International Coinference on Image Processing IICIP), pp. 1025-1028.

He, et al.; "H.26L-Based Fine Granularity Scalable Video Coding"; ISCAS 2002; vol. 4, pp. 548-551, Phoenix, USA, May 2002.

Agi, et al.; "An Empirical Study of Sceure MPEG Video Transmissions"; Proc.Symp.Network & Distributed System Security, 1996, pp. 137-144.

Shi, et al., "A Fast MPEG Video Encryption Algorithm"; Proc. of ACM Multimedia '98, 1998, pp. 81-88.

Shi, et al., "An Efficient MPEG Video Encryption Algorithm"; IEEE Proc. 17th Symp. Reliable Distributed Systems, 1998, pp. 381-386.

Tang, Lei; "Methods for Encrypting and Decrypting MPEG Video Data Efficiently"; Proc. ACM Multimedia '96, 1996, pp. 219-230.

Zeng, et al., "Efficient Frequency Domain Video Scrambling for Content Access Control"; Proc. ACM Multimedia '99, 1999, pp. 285-294.

Zeng, et al., "Efficient Frequency Domain Selective Scrambling of Digital Video"; a preprint to appear in IEEE Trans. Multimedia.

Wen, et al.; "A Format-Complaint Configurable Encryption Framework for Access Control of Video", IEEE Trans. Circuits & Systems for Video Technology, vol. 12, No. 6, 2002, pp. 545-557.

Zeng, et al., "Fast Self-synchronous Content Scrambling by Spatially Shuffling Codewords of Compressed Bitstreams"; IEEE Inc., Conf. Image Processing, 2002, vol. 3, pp. 169-172.

Wee, et al., "Secure Scalable Streaming Enabling Transcoding without Decryption"; IEEE Int. Conf. Image Processing, 2001, vol. 1, pp. 437-440.

Grosbois, et al.; "Authentication and access control in the JPEG 2000 compressed domain"; Proc. of SPIE 46th Annual Meeting, App;ications of Digital Image Processing XXIV, San Diego, 2001.

Jakubowski, et al.; "The chain & sum primitive and its applications to MACs and stream ciphers"; Eurocrypt '98, pp. 281-293, 1998, incorporated herein by reference.

Wen, et al.; "A Format-Complaint Configurable Encryption Framework for Access Control of Multimedia"; 0-7803-7025-2/01, 2001 IEEE; pp. 435-440.

Spanos; et al.; "Performance Study of a Selective Encryption Scheme for the Security of Networked, Real-Time Video"; 0-8186-7180-7/95, 1995 IEEE.

* cited by examiner

FULLY SCALABLE ENCRYPTION FOR SCALABLE MULTIMEDIA

TECHNICAL FIELD

This invention relates generally to multimedia protection and more specifically to fully scalable encryption for scalable multimedia.

BACKGROUND

Scalable video coding imparts flexibility and adaptability to multimedia content so that it can be suited to many different applications and environments. Scalable multimedia formats include, among others, several MPEG stream formats and "scalable media adaptation and robust transport" (SMART and SMART++). (See, e.g., <http://research.microsoft.com/im/>. Microsoft Corporation, Redmond, Washington; Feng Wu, Shipeng Li, Ya-Qin Zhang, "A framework for efficient progressive fine granular scalable video coding", IEEE Trans. on Circuits and Systems for Video Technology, vol. 11, no. 3, pp. 332-344, 2001; Xiaoyan Sun, Feng Wu, Shipeng Li, Wen Gao, Ya-Qin Zhang, "Macroblock-based temporal-SNR progressive fine granularity scalable video coding", IEEE International Conference on Image Processing (ICIP), pp. 1025-1028, Thessaloniki, Greece, October, 2001; and Yuwen He, Feng Wu, Shipeng Li, Yuzhuo Zhong, Shiqiang Yang, "H.26L-based fine granularity scalable video coding", ISCAS 2002, vol. 4, pp. 548-551, Phoenix, USA, May 2002).

MPEG-4 has adopted profiles to provide scalability to different devices. One such MPEG-4 profile is called the "Simple" profile. "Simple" provides a video base layer upon which other profiles, such as "Simple Scalable" can add an enhancement layer to provide the scalability. Another profile called "Advanced Simple" performs rectangular video object coding by adding some coding tools to the "Simple" profile. This "Advanced Simple" profile, while having the latest MPEG-4 coding efficiency tools, provides no scalability. Yet another MPEG-4 profile that provides a scalable video coding scheme by adding a fine-grained enhancement layer to the "Advanced Simple" base layer is called "Fine Granularity Scalability (FGS)." FGS has become a standard.

The base layer used in some of these scalable MPEG-4 profiles is encoded in a non-scalable manner at the lowest bound of bitrates. The FGS profile includes an enhancement layer predicted from the low bitrate base layer that strives to achieve the optimal video quality for each bitrate in a spectrum of bitrates possible with the same enhancement layer. The enhancement layer is encoded in a scalable manner: the discrete cosine transformation (DCT) coefficients of a frame's residue II are compressed bit-plane wise from the most significant bit to the least significant bit. A video is compressed by MPEG-4 FGS only once. When it is transmitted over a network, a server can discard the enhancement layer data associated with the least significant bit(s) should the transmitting network lack required bandwidth. Other rate shaping operations can also carried out on the compressed enhancement layer data directly without resorting to either compression or decompression. The above-described FGS profile will be referred to herein as MPEG-4 FGS, or just "FGS."

Multimedia encryption techniques for multimedia streams conforming to the various scalable MPEG-4 profiles ideally have the same features that are desirable in non-scalable codecs, namely high security, low complexity, low compression overhead, error resilience, rate shaping adaptability, and random play ability. Some of these will now be discussed in greater detail.

Security is an essential requirement for multimedia encryption. Compared with other types of encryption for more critical applications, such as military and banking processes, multimedia encryption has its own particular issues, including the relatively large amount of (video) data to be encrypted and the characteristically low value of the data, compared with military and banking data.

Low complexity is a feature because any encryption or decryption process adds processing overhead. Since a multimedia stream has a relatively vast amount of data, it is desirable or mandatory in many applications that the complexity of an encryption system be very low, especially during decryption, since many applications require real time decryption of the vast amount of multimedia data, and usually on a user's limited equipment.

Compression overhead is also a feature since encryption inevitably affects compression efficiency by reducing the compression algorithm's coding efficiency or by adding bytes to the already compressed file. Thus, the compression overhead is ideally minimized for multimedia encryption algorithms.

Error resilience is important for encryption because faults occur during multimedia storage and transmission. Wireless networks are notorious for transmission errors. Data packets may be lost in transmission due to congestion, buffer overflow, and other network imperfections. Encryption schemes should ideally be resilient to bit error and package losses. They should also allow quick recovery from bit errors and fast resynchronization from package losses to prevent extensive error propagation. Many multimedia encryption algorithms, typically designed under perfect transmission environments, propagate great perceptual degradation when bit errors or package losses occur during transmission.

Rate shaping describes the ability to vary the transmission bitrate (number of bits in one second of a stream) to suit various conditions. During multimedia stream delivery from the content owner to the user, many middle stages typically process the data. Transcoding, for example, may change the bitrate to adapt to transmission bandwidth fluctuation or even application requirements. If the data is encrypted, these middle stages typically must call for encryption and decryption keys and then execute cycles of decryption and encryption in order to process the data. This increases processing overhead and reduces security since encryption secrets have to be shared with these middle stages.

Associated with the security feature discussed above, it is often desirable to encrypt a multimedia stream for digital rights management (DRM). Such encryption can help a content owner enforce copyright and other property rights, such as licensing of multimedia content.

Many algorithms have been proposed to encrypt non-scalable video. The most straightforward method is the naive algorithm which applies standard encryption schemes such as DES on the compressed stream in the same way as if it were text data (I. Agi and L. Gong, "An Empirical Study of Secure MPEG Video Transmissions," Proc. Symp. Network & Distributed System Security, 1996, pp. 137-144). A naive algorithm usually has a large processing overhead due to the large amount of video data to be processed. It has minimal error resilience, and does not allow rate shaping on the ciphertext directly.

Another method is the selective algorithm which exploits the video stream structure and encrypts only part of the compressed video data (T. B. Maples and G. A. Spanos, "Performance Study of a Selective Encryption Scheme for the Security of Networked, Real-time Video," *Proc. 4th Int. Conf. Computer Communications & Networks*, 1995; and J. Meyer and F. Gadegast, "Security Mechanisms for Multimedia Data with the Example MPEG-1 Video," http://www.gadegast.de/frank/doc/secmeng.pdf, 1995). The partial data to be encrypted can be I-frames, I-frames plus all I-blocks in P and B frames, or the DC coefficients and lower AC terms of the I-blocks. Encrypting only I-frames does not provide sufficient security due to exposed I-blocks in the P and B frames as well as interframe correlation (see the Agi and Gong reference, above).

A method to reduce the data to be encrypted is proposed in (L. Qiao and K. Nahrstedt, "Comparison of MPEG Encryption Algorithms," *Int. J. Computers & Graphics*, Special Issue: "Data Security in Image Communication and Network", vol. 22, no. 3, 1998) which encrypts only the bytes at even indexes for a chunk of an I-frame, and the rest is replaced by the result of XORing the odd-indexed subsequence with the even-indexed subsequence.

Another selective algorithm pseudo-randomly changes the sign bits of all DCT coefficients (C. Shi and B. Bhargava, "A Fast MPEG Video Encryption Algorithm," *Proc. of ACM Multimedia*'98, 1998, pp. 81-88) or the sign bits of differential values of DC coefficients of I blocks and sign bits of differential values of motion vectors (C. Shi and B. Bhargava, "An Efficient MPEG Video Encryption Algorithm," *IEEE Proc. 17th Symp. Reliable Distributed Systems*, 1998, pp. 381-386).

A third approach is the scrambling algorithm which scrambles some compression parameters or shuffles codewords to prevent unauthorized users from correct decompression. A simple scheme uses a random permutation instead of the normal zigzag order to map a 2D block to a 1D vector (L. Tang, "Methods for Encrypting and Decrypting MPEG Video Data Efficiently," *Proc. ACM Multimedia*'96, 1996, pp. 219-230). Motion vectors and selected DCT coefficients can be shuffled before entropy coding (W. Zeng and S. Lei, "Efficient Frequency Domain Video Scrambling for Content Access Control," *Proc. ACM Multimedia*'99, 1999, pp. 285-294; and "Efficient Frequency Domain Selective Scrambling of Digital Video," a preprint to appear in *IEEE Trans. Multimedia*).

VLC (variable length coding) codes can also be shuffled in a format-compliant way (J. Wen, M. Severa, W. Zeng, M. H. Luttrell, and W. Jin, "A Format-compliant Configurable Encryption Framework for Access Control of Video," *IEEE Trans. Circuits & Systems for Video Technology*, vol. 12, no. 6, 2002, pp. 545-557). These schemes change the data's statistical properties, and thus lower compression efficiency. A scheme that performs without incurring the bit overhead has also been proposed. (W. Zeng, J. Wen, and M. Severa, "Fast Self-synchronous Content Scrambling by Spatially Shuffling Codewords of Compressed Bitstreams," *IEEE Int. Conf. Image Processing*, 2002, vol. 3, pp. 169-172) which spatially shuffles codewords of the compression bitstream.

While some of the schemes mentioned above and others, for example most scrambling algorithms, are equally applicable to MPEG-4 FGS, most encryption schemes developed for non-scalable multimedia, when applied to a scalable multimedia stream, often diminish or destroy the scalability features. To apply a scalable manipulation to such an encrypted scalable stream, intermediate transmission stages often have to decrypt the stream, apply rate shaping, such as transcoding and/or bit reduction, and then re-encrypt the stream. Thus, a technique for encrypting scalable multimedia streams while maintaining the scalability features is needed.

Schemes specifically designed for scalable formats have been reported recently. Wee et al., propose a secure scalable streaming (SSS) scheme that enables transcoding without decryption. (S. J. Wee and J. G. Apostolopoulos, "Secure Scalable Streaming Enabling Transcoding Without Decryption," *IEEE Int. Conf. Image Processing*, 2001, vol. 1, pp. 437-440.) For MPEG-4 FGS, the approach encrypts video data in both base and enhancement layers except header data. Hints for rate distortion optimal (RD-optimal) cutoff points have to be inserted into the unencrypted header for an intermediate stage to perform RD-optimal bitrate reduction. Encryption granularity depends on the way a video stream is packetized. More precisely, encryption is applied to each packet. This means that when encryption is applied in SSS, the packet size has to be known. No modification on the packet size is allowed after encryption is done in SSS. In real applications, a packet size designed for one type of transmission channel may not be appropriate for another. For example, the video packet size for wireless transmission has to be small since the channel is error-prone. For Internet transmission, a video packet should be large for efficient transmission since the error rate for the Internet is very small. Any intermediate stage that wants to change the packet size to best fit into the transmission channel needs to resort to the decryption/re-encryption cycle in SSS.

Grosbois et al., propose a scalable authentication and access control scheme for the image compression standard of JPEG 2000. (Raphael Grosbois, Pierre Gergelot, and Touradj Ebrahimi, "Authentication and Access Control in the JPEG 2000 compressed domain," *Proc. of SPIE 46th Annual Meeting, Applications of Digital Image Processing XXIV*, San Diego, 2001.) It is based on modification and insertion of information in the bit steam. A keyed hash value is used to generate a pseudo-random sequence that is used to pseudo-randomly invert the signs of high-frequency band wavelet coefficients. Layered access structure allows adaptation to different applications. One of its major drawbacks is the insertion of extra information to aid decryption, which reduces compression efficiency.

SUMMARY

Subject matter includes exemplary systems and related methods for fully scalable encryption of scalable multimedia. A scalable bitstream encrypted using the subject matter maintains full functionality of scalable features in the encrypted form. The exemplary scalable encryption allows transcoding, rate shaping, and other operations directly on the ciphertext without degradation of scalable compression efficiency and error resiliency. The subject matter can be applied to scalable multimedia streams including, for example, MPEG-4 FGS, MPEG-4 FGST, SMART, and SMART++ streams.

An exemplary scalable method encrypts only the base layer. Another exemplary scalable method encrypts both the base layer and the enhancement layer(s) of a scalable multimedia stream. The base layer can be selectively encrypted for light security requirements or fully encrypted for more stringent security requirements.

DETAILED DESCRIPTION

Overview Subject matter includes systems and related methods for fully scalable encryption of scalable multimedia, such as bitstreams adhering to the newly adopted MPEG-4 Fine Granularity Scalability (FGS) video coding standard and other scalable multimedia coding schemes like SMART video and audio coding. These scalable bitstreams offer full scalability to enable easy and flexible adaptation of the same stream to different transmission and application needs. The subject matter provides encryption techniques that strive to preserve the scalability features of the unencrypted scalable bitstreams. Such exemplary systems and related methods are useful for encryption-based digital rights management (DRM) via scalable multimedia coding schemes.

According to one aspect of the subject matter, an exemplary method with relatively low complexity is presented to encrypt scalable bitstreams for applications such as digital rights management. The exemplary method enables full FGS functionality using the encrypted ciphertext directly. This prevents the need to decipher the bitstream during intermediate operations on the bitstream. Using the subject matter, an intermediate stage, such as a process or device that fits the bitstream to the dynamic environment (e.g., a network device that reduces a stream's bitrate to fit a network with limited bandwidth), can perform FGS operations, such as transcoding, rate shaping, and re-packetization without having to decrypt the ciphertext. Since encryption and decryption cycles need not be repeated by each intermediate device during transmission, better security can be maintained as keys and other secrets do not have to be shared with the intermediate stages. This greatly reduces the processing load for intermediate stages, and increases the end-to-end security of an exemplary scalable encryption system. The exemplary encryption system 200 also preserves fine granularity so that the remaining FGS bitstream is still an RD optimized video stream if truncations or other rate shaping manipulations occur.

In addition, exemplary encryption systems and methods cause no degradation to scalable compression efficiency and error resiliency to transmission packet losses and bit errors. The exemplary systems and methods also allow random access and reverse play of the encrypted stream.

Overview of Exemplary Scalable Encryption Systems

Figure 1:
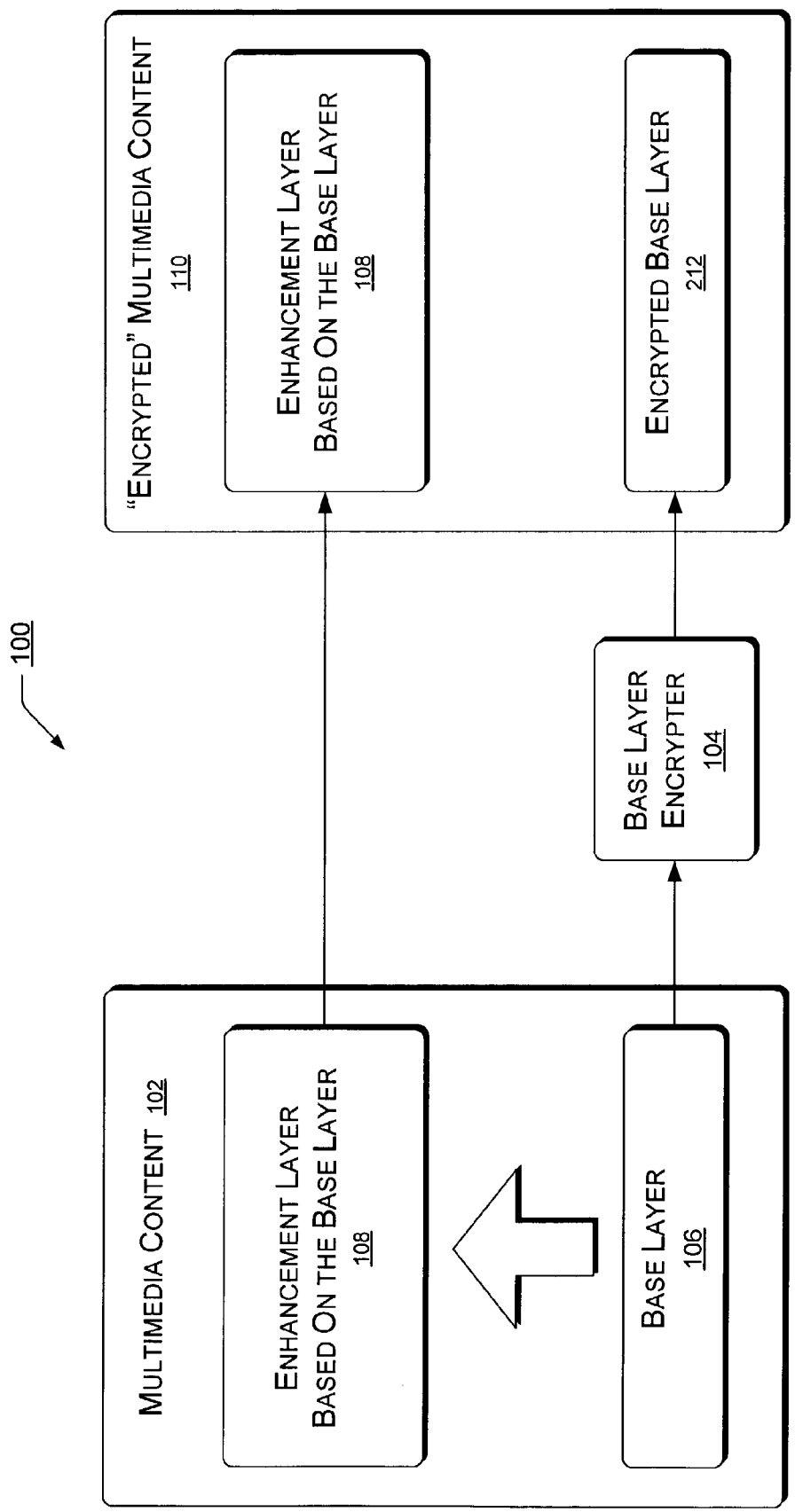
FIG. 1 is a block diagram of an exemplary scalable encryption which encrypts only the base layer.

FIG. 1 shows an exemplary scalable encryption system 100 for a scalable multimedia content 102 consisting of the base layer 106 and enhancement layer 108 that is based on the base layer 106. It contains a base layer encrypter 104 that receives the base layer 106 and uses at least one key or secret to convert it into a selectively or fully encrypted base layer 212. The enhancement layer 108 is not encrypted in order to keep the full scalability of the original (i.e., non-encrypted) scalable multimedia content 102.

Figure 2:
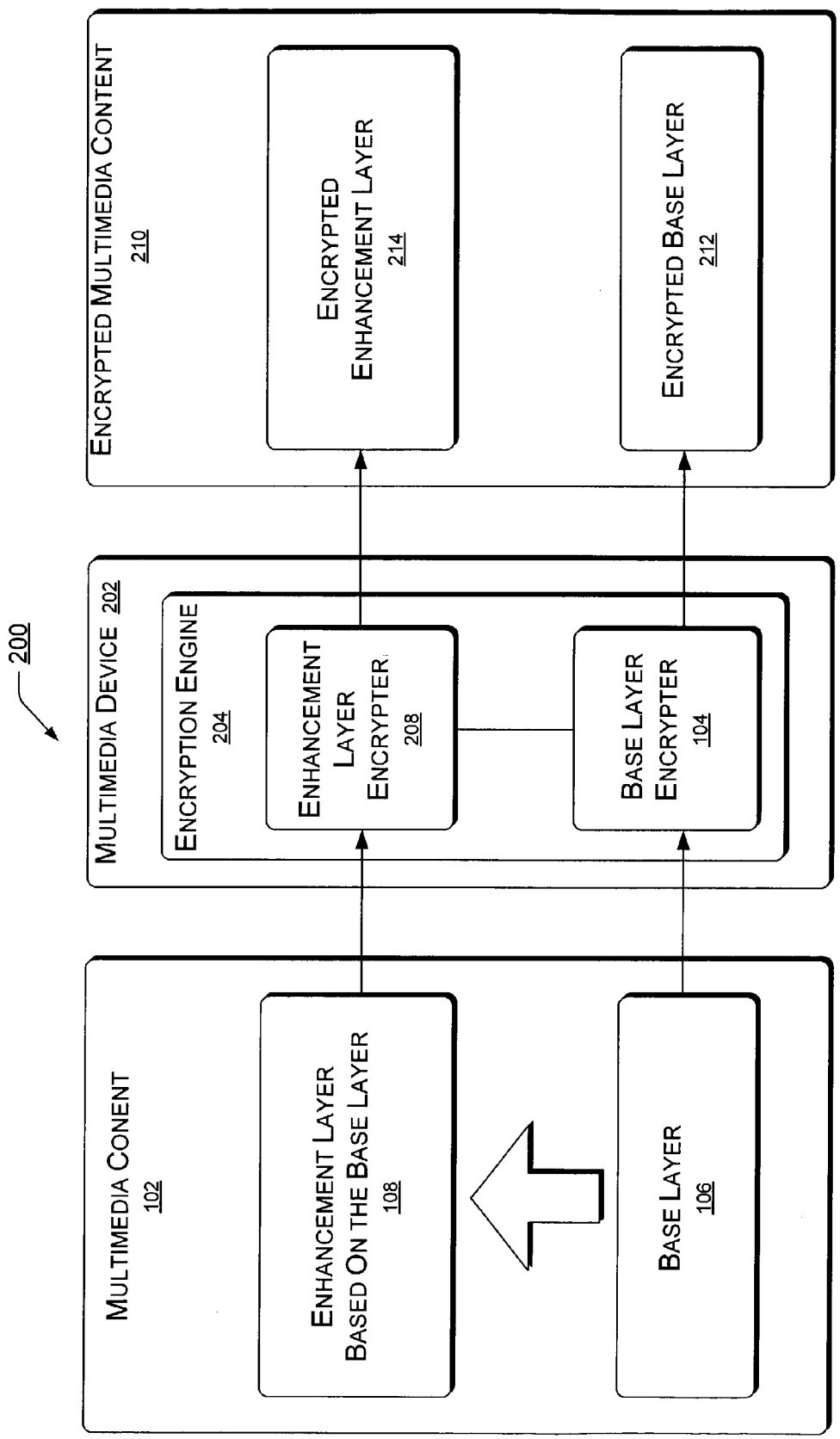
FIG. 2 is a block diagram of an exemplary scalable encryption system which encrypts both base layer and enhancement layer.

FIG. 2 shows another exemplary scalable encryption system 200 which encrypts both the base layer 106 and enhancement layer 108 with different schemes. The exemplary system 200 includes an exemplary multimedia device 202 that has an exemplary encryption engine 204. The encryption engine 204 includes the base layer encrypter 104 communicatively coupled with an enhancement layer encrypter 208.

The exemplary multimedia device 202 receives a scalable multimedia content 102 having a base layer 106 and at least one enhancement layer 108, for example, a scalable MPEG-4 FGS bitstream, and encrypts the multimedia content 102 into a scalable encrypted multimedia content 210 using the exemplary encryption engine 204. The exemplary encryption engine 204 receives both the base layer 106 and the enhancement layer 108 of the multimedia content 102 and uses at least one key, secret, and/or other information that is based on base layer content (i.e., a "base layer key" to be discussed below) to convert the enhancement layer 108 into a selectively encrypted enhancement layer 214. In addition to the content-based base layer key, other information and global keys may be used in the encryption. A global key is any piece of information that is used to encrypt an entire frame, cell, stream segment, or stream. Typically a global decryption key refers to a decryption secret for unlocking the encryption on a multimedia stream for an entire video, movie, etc. Multiple keys, information, and secret may be referred to as a stream cipher key or may actually be combined into a stream cipher key.

The FGS bitstream will be used herein as an example of a scalable multimedia content 102. FGS divides the multimedia content 102 into one base layer 106 and in the following examples, one enhancement layer 108. In the FGS profile, an FGS video object plane mode (FGS VOP) uses the base layer 106 as a reference source for prediction of enhancement layer VOPs while an FGS temporal video object plane mode (FGST VOP) can use forward, backward, or bi-direction prediction from the base layer 106 for enhancement layer VOPs.

Exemplary Encryption Engine

Figure 3:
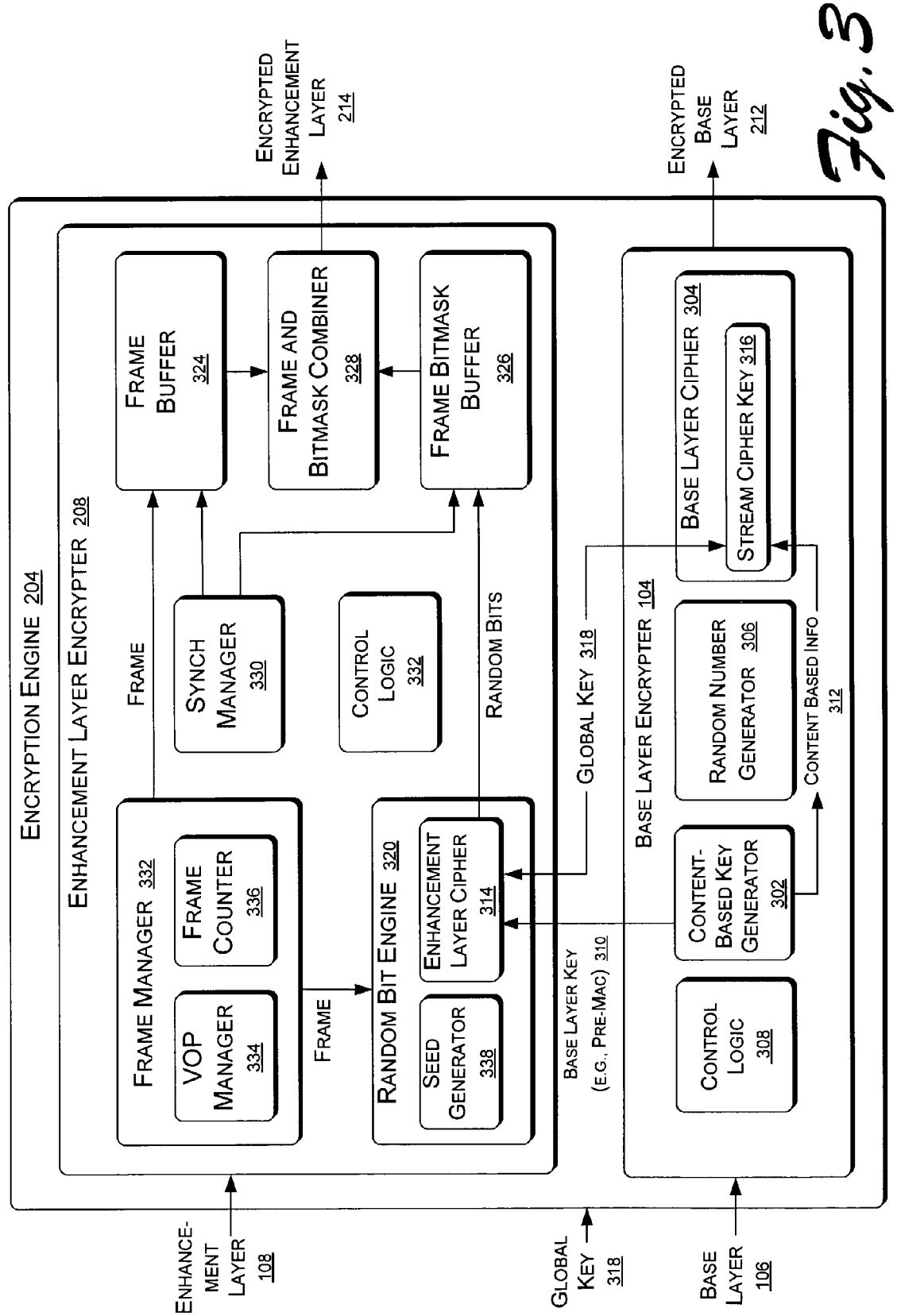
FIG. 3 is a block diagram of an exemplary scalable encryption engine.

FIG. 3 shows the exemplary encryption engine 204 of FIG. 2 in greater detail. The base layer encrypter 104, which receives (and/or derives) the base layer 106 from the multimedia content 102, is communicatively coupled with the enhancement layer encrypter 208, which receives (and/or derives) one or more enhancement layers 108 from the multimedia content 102. The exemplary encryption engine 204 can receive one or more global keys 318 or other encryption information in addition to the incoming multimedia content 102.

Base Layer Encrypter

In one implementation of the exemplary encryption engine 204, the base layer encrypter 104 has components to execute exemplary scalable encryption, such as a content-based key generator 302, a stream cipher 304, and a random number generator 306 communicatively coupled with control logic 308 as shown.

In one implementation, this exemplary encryption engine 204, using a modification of an encryption technique by Jakubowski and Venkatesan called "C&S encryption." (Mariusz H. Jakubowski, Ramarathnam Venkatesan, "The Chain & Sum Primitive and Its Applications to MACs and Stream Ciphers", *EUROCRYPT '98*, pp. 281-293, 1998, incorporated herein by reference). C&S encryption denotes universal block chaining with sum, or, chain and sum primitive (C&S for short), which is applied in combination for encrypting and authenticating 19 data. The primitive is a "weak" CBC-type encryption that is applied with a summing step, and is used as a front end for stream ciphers to encrypt blocks of data in a video stream.

As executed by the exemplary encryption engine 204, a sequence of input data, e.g., a segment of a multimedia content 102 representing a video frame or cell of base layer content (that consists of or is analogous to hundreds of "machine words"), is processed by the CBC-type primitive. In the primitive, the cipher is replaced by a pair of invertible universal hash functions applied alternately. The output words of the base layer content are summed up and written in place of the next-to-last "word" in the frame or cell. The last two words, called the "pre-MAC" ("MAC" stands for message authentication code), are encrypted with a block cipher. This pre-MAC value is implicitly a MAC value for the base layer content and can also serve as a content-based part of a key for encrypting the enhancement layer 108 as well as content based info 312 for encrypting the base layer 106 itself. The pre-MAC, when used as a base layer key 310, can be used directly or indirectly to synchronize at least one of the stream ciphers 304, 314, to generate a stream cipher key 316, or to compute a pseudo-random one-time pad using the base layer cipher 304 for encrypting the rest of the bulk base layer content.

Even though the exemplary encryption engine 204 may encrypt large amounts of data, the encryption need be applied only once (per base layer 106 and enhancement layer 108), for example, the encryption can be applied at the same time that one-time compression is performed in the FGS scheme. Since an exemplary C&S encryption is of relatively low complexity compared with other encryption routines, the encryption (and decryption) is(are) relatively fast. The encryption applied by the exemplary encryption engine 204 typically causes no degradation to either compression efficiency or error resilience.

To increase speed, the base layer encrypter 104 may substitute RC5, AES or other block ciphers for DES for the encryption of the base layer key 310, e.g., the pre-MAC. The exemplary C&S encryption does not increase data size within a frame, cell, etc. since the content-based key generator 302 produces a key that replaces part of the data to be encrypted. In typical implementations, the base layer key 310 is a pre-MAC, which together with a global encryption key 318 for the frame, cell, video, etc. is fed into the stream cipher 304 (typically using and/or comprising an encryption algorithm such as RC4), to encrypt the bulk of the multimedia data, i.e., the rest of the encryption cell from the base layer content. (The pre-MAC, as mentioned, is encrypted separately using RC5 to increase speed in forming the MAC.) The MAC is reversible so that a decrypter (not shown) can later reverse the encryption to retrieve the original plaintext if no bit errors occur. Since the stream cipher key 316 depends on both the global encryption key 318 and also the pre-MAC, which can be understood as one or more hash values of some of the data to be encrypted, encryption security is very strong. In other words, two different contents with only negligible differences will be encrypted into different ciphertexts even though the same global encryption key 318 is repeatedly used.

The base layer 106 can be encrypted either selectively or fully. In the is exemplary selective encryption mode, the DC values of set of base layer bits, e.g., i.e. intra_dc_coefficients and dct_dc_differentials, sign bits of DCT coefficients, sign bits of motion vectors horizontal_mv_data and vertical_mv_data, and/or the motion vector residues horizontal_mv_residual and vertical_mv_residual are extracted to form a vector to be encrypted using the encryption, e.g., the exemplary modified C&S encryption described above, for each frame. The ciphertext is then put back into original fields to replace original data in the base layer 106. In the exemplary full encryption mode, entropy coded video data in the base layer 106, except VOP headers, is encrypted using, e.g., the exemplary C&S encryption, for each frame.

It should be noted that the base layer encryption in either full encryption mode or selective encryption mode does not affect the entropy coding of the multimedia data. Since the exemplary C&S encryption preserves the size of the data to be encrypted, the exemplary encryption has no negative impact on FGS compression efficiency. It is also worth noting that the selective encryption mode just described is fully MPEG-4 FGS compatible.

In the above exemplary implementation, the base layer encrypter 104 may be performing encryption for an application or device that requires collecting enough data for an entire frame before performing decryption. Such an application or device has to buffer the entire base layer frame and remember the position and number of bits for each encrypted field or else parse the data of a base layer frame twice (once for decryption, and once for decompression). The exemplary C&S encryption may not be acceptable for some of these types of applications and devices. As an alternative exemplary implementation, a stream cipher such as RC4, or a block cipher such as DES, AES, RC5, used in various modes, such as ECB (Electronic Codebook), CBC (Cipher Block Chaining), or OCB (Offset Codebook) modes, can be used to replace the exemplary C&S encryption for either the full encryption mode or the selective encryption mode. The random number generator 306 may be then employed to produce a different random number for each frame. The random number may be inserted into the header of each base layer frame and may be combined with the global encryption key 318 as input for the stream cipher 304 to generate different random bits in each frame to XOR with the data to be encrypted for the frame, or as input for the block cipher encryption to encrypt the data to be encrypted for the frame. For a normal length video, a 32-bit random number should provide enough capacity for all frames in a video, and if so, the overhead affecting the compression efficiency would be 32 bits per base layer frame. The 32-bit random numbers practically assure non-repeating random sequences to encrypt each video frame (unless there is a collision of random numbers, which is a very small probability if a good quality random number generator is used). Since RC4 has an enormous number of possible states, its substitution for the exemplary C&S encryption can ensure security of the encrypted content. The inserted random number is also used as the base layer key 310 (instead of, e.g., a pre-MAC) in the encryption of the enhancement layer 108, described next.

Enhancement Layer Encrypter

As shown in FIG. 1, the simplest exemplary implementation is to leave the enhancement layer unencrypted. Since the enhancement layer 108 is predicted or derived from video object planes (VOPs) from the base layer 106 as a reference, protection of the base layer 106 would be enough for protection of the entire multimedia content 102 in some applications. In this exemplary implementation, an "encrypted" multimedia stream 110 is produced that includes an encrypted base layer 212 and the unencrypted enhancement layer 108 predicted or derived from the unencrypted base layer 106.

From the point of view of each individual VOP, such an exemplary implementation seems to be very secure. Without knowing a decryption key, a reconstructed frame from both the encrypted base layer 212 and the unencrypted enhancement layer 108 does not contain any useful information. From the global point of view of a video that consists of VOPs, however, a different conclusion is evident.

If a QCIF video is compressed into a low bitrate (around 50 Kb per second) base layer 106 and an enhancement layer 108, with a total bitrate of approximately 1.0 Mb per second, and the pixel values from the base layer 106 are set to zero (or another fixed value), and the reconstructed FGS video is played, the following observations may be made. First, if each individual reconstructed frame is examined, each is very random, and not much useful information can be extracted. But if the reconstructed video is played, the outline of moving objects is readily visible. More importantly, such moving objects and their actions are correctly, semantically, observed by the human eye. In many applications, such video information leaking from a video encryption system may not be acceptable. This phenomenon is probably explained by strong correlation among neighboring frames in a video. When the reference frames in the base layer 106 are strongly correlated, a series of enhancement layer frames reveal much more information than intended by the base layer encrypter 104. Thus, encryption of the base layer 106 alone may not be enough for encrypting many types of scalable multimedia content 102 for many applications.

Returning to FIG. 3, an alternative exemplary enhancement layer encrypter 208 included in the exemplary encryption engine 204 includes the above-mentioned enhancement layer cipher 314, which is included in a random bit engine 320. The exemplary enhancement layer encrypter 208 also includes a frame manager 322, a frame buffer 324, a frame bitmask buffer 326, a frame and bitmask combiner 328, and a resynchronization information manager, or "synch manager" 330, all communicatively coupled with control logic 332 as illustrated. The frame manager 322 may further include a VOP manager 334 and a frame counter 336. The random bit engine 320 includes a seed manager 338. The exemplary enhancement layer encrypter 208 may include additional components or fewer components than the illustrated example. Functions of the exemplary enhancement layer encrypter 208 will now be provided in a brief overview, followed by a more lengthy description.

In brief, the exemplary enhancement layer encrypter 208 selectively encrypts an enhancement layer 108, in one implementation, by XORing sign bits of DCT coefficients in the enhancement layer 108 with random or pseudo-random sequence of bits. Each frame of the multimedia stream uses a different random sequence of bits to avoid applying the same random sequence to different frames, inducing vulnerability in the security of the encryption. For MPEG-4 FGST 11implementations, motion vectors are also encrypted in a manner similar to the DCT coefficients. The operation of the exemplary enhancement layer encrypter 208 will now be described in greater detail.

The exemplary scalable encryption of the enhancement layer 108 is greatly facilitated by the encryption of the base layer 106 previously described. The base layer key 310, such as the pre-MAC, is communicated from the base layer encrypter 104 to the enhancement layer encrypter 208 and together with the global encryption key 318 is fed into the random bit engine 320. (In the case of an FGST VOP based on more than one base layer frame, a base layer key 310 from each base layer frame may be fed into the random bit engine 320 along with the global encryption key 318.) An enhancement layer cipher 314 in and/or associated with the random bit engine 320 uses a technique such as RC4 to generate a random sequence of bits to XOR with the sign bits of the DCT coefficients in the enhancement layer 108. The details of performing the XORing of the random or pseudo-random sequence of bits with the DCT coefficients in the enhancement layer 108, is described more fully below.

The seed manager 338 in the random bit engine 320 ensures that the same sequence of bits produced by the random bit engine 320 for encrypting a frame of the enhancement layer 108 is not also used for encrypting a corresponding frame of the base layer 106 in selective encryption of the base layer 106. The bit sequences may be pseudo-random, and therefore repeatable, and application of the same sequence of bits to multiple frames would compromise security. The random bit engine 320 uses the seed manager 338 to prevent a repetition of a pseudo-random sequence that would compromise the encryption. One way this may be accomplished is by feeding the enhancement layer cipher 314 a fixed string, perhaps part of the enhancement layer, as a seed to randomize sequences.

The random bits generated by the random bit engine 320 (e.g., by the included enhancement layer cipher 314) are organized into an array or binary matrix corresponding to the arrangement of relevant bits in the operative video frame as determined by the frame manager 322. This array or binary matrix can be referred to as a "frame bitmask" or "bitmask." In one implementation, a frame buffer 324 may be used to hold a frame of the enhancement layer 108 while a frame bitmask buffer 326 holds the frame bitmask composed of the randomly generated bits. A frame and bitmask combiner 328 XORs a DCT coefficient sign bit in the enhancement layer frame with the corresponding random bit in the frame bitmask. In other words, the sign bit of a DCT coefficient in the enhancement layer 108, should it appear in the enhancement layer 108, XORs the random bit at the same position in the frame bitmask. If there is any packet loss during transmission of scalable encrypted enhancement layer 214 generated by the frame and bitmask combiner 328, the received packets can be easily realigned with the correct random bits for decryption in spite of the missing packet.

It is also possible to use bit-plane coding for all the DCT coefficients in the temporal enhancement frame, which is called the FGST temporal scalability (FGST). FGS VOPs and FGST VOPs can be organized into either a single enhancement layer or two separate enhancement layers. Each FGST VOP can be coded, for example, using forward, backward, or bi-directional prediction from the base layer. Resynchronization markers can be inserted into FGS stream by the synch manager 330 to reduce error propagation in case bit error or package loss occurs. The bit-plane separator fgs_bp_start_code in the enhancement layer can also be used as the resynchronization marker for error resilience purposes.

For exemplary scalable encryption of FGST VOPs, motion vectors are added to the set(s) of bits encrypted. The exemplary encryption is like that described above for base layer selective encryption. The motion vector bits are encrypted using the enhancement layer cipher 314 in the same way as the DCT sign bits.

Figure 4:
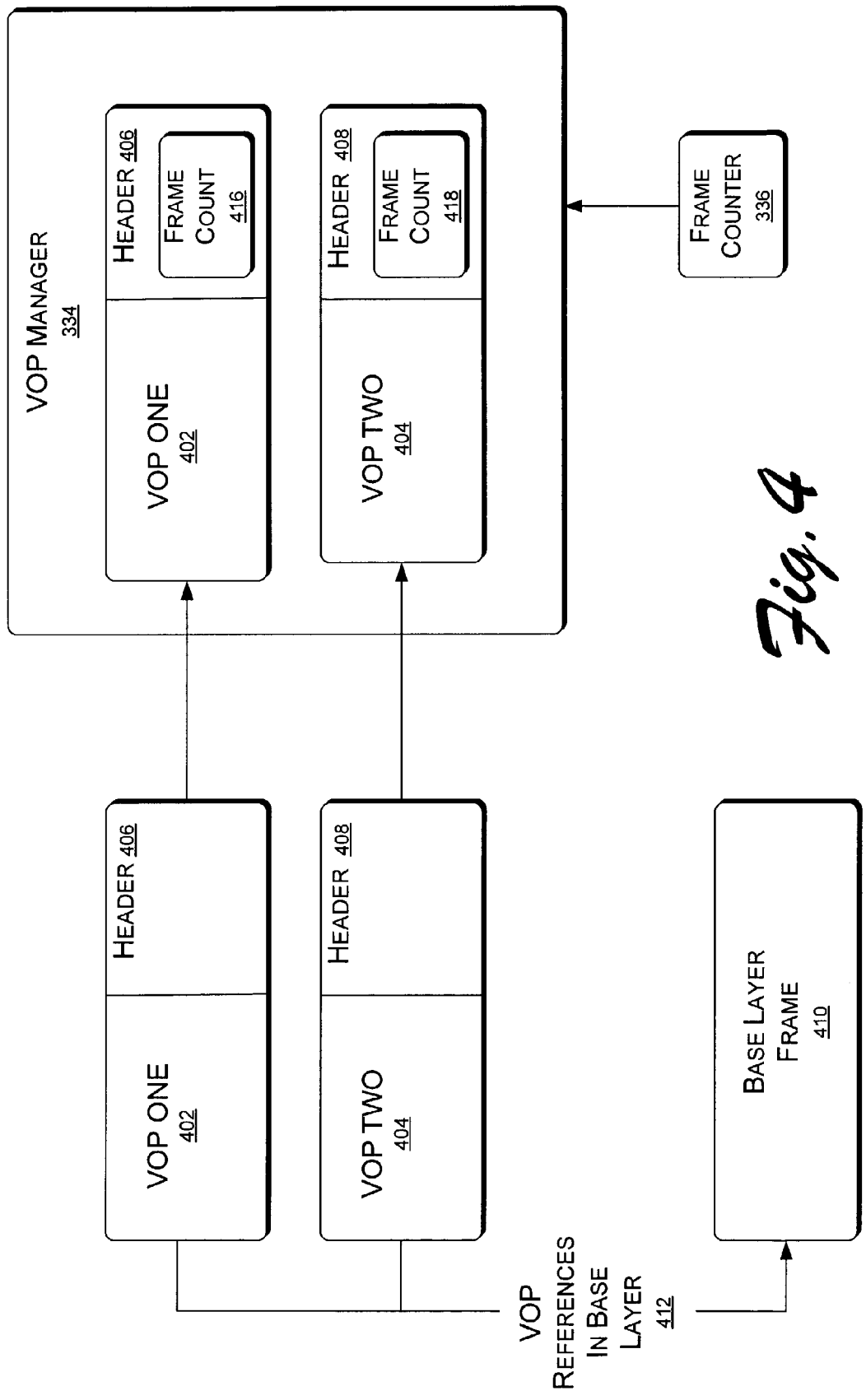
FIG. 4 is a block diagram of an exemplary video object plane manager of the exemplary scalable encryption engine of FIG. 3.

As shown in FIG. 4, multiple FGST VOPs 402, 404, each with a header 406, 408 may use the same base layer frame 410 as their source of reference VOPs 412. If the random bit engine 320 as described above were to generate the same random bits for different FGST VOPs based on the same base layer frame 410, compromised security would result. The VOP manager 334 inserts a frame count 416, 418 produced by the frame counter 336 into FGST VOP headers 406, 408. This frame count 416, 418 is fed into the enhancement layer cipher 314 (employing, e.g., RC4) so that different random bits are generated for each of the FGST VOPs 402, 404 that are based on the same base layer frame 410. The same frame count sequence can be reused or restarted for different groups of FGST VOPs that are based on a different base layer frame since other information fed into the enhancement layer cipher 314 for the different base frame, prevents duplication. That is, the base layer key 310 is different for each base layer frame 410. Two or three bits of overhead per FGST enhancement layer frame is sufficient for the frame counter 336 to operate effectively in most applications. The frame count 416, 418 inserted by the VOP manager 334 is more effective than a time stamp since some processes performed in an intermediate stage during transmission of the encrypted multimedia content 210 may alter the time stamp. Also, the frame count 416, 418 allows a decrypting entity to generate correct random bits for decryption of received FGST VOPs 402, 404 if packets containing some of the FGST VOPs 402, 404 are dropped during transmission.

The exemplary enhancement layer encrypter 208 preserves the error resiliency of the original unencrypted enhancement layer 108 and enables all the is scalable enhancement layer operations provided with FGS compression.

In some implementations of the exemplary encryption engine 204, the base layer cipher 304 and the enhancement layer cipher 314 may be the same module or routine. They are shown as separate entities in the illustrated implementation to emphasize that a cipher process occurs in relation to the encryption of both the base layer 106 and the enhancement layer(s) 108.

Exemplary Methods

Figure 5:
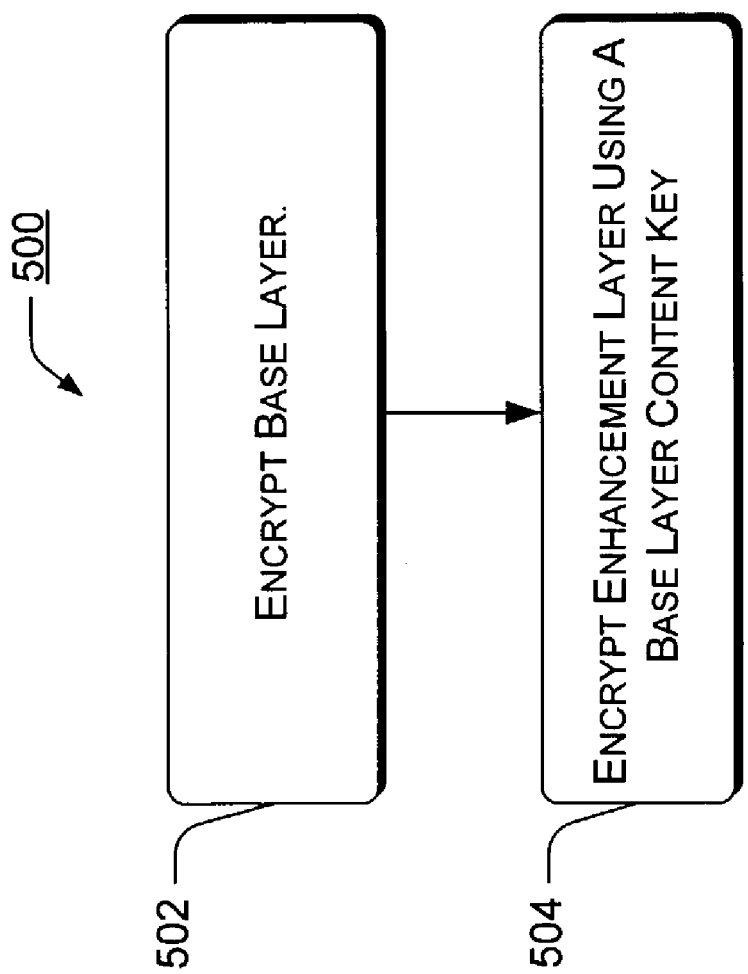
FIG. 5 is a flow diagram of an exemplary scalable encryption method.

FIG. 5 shows an exemplary scalable encryption method 500. This exemplary scalable encryption method 500 can be performed by a device, such as the exemplary encryption engine 204 shown in FIGS. 2 and 3. In the flow diagram, the operations are summarized in individual blocks. The operations may be performed in hardware and/or as machine-readable instructions (software or firmware) that can be executed by a processor.

At block 502, a base layer frame of a scalable multimedia stream is encrypted.

At block 504, an enhancement layer of the scalable multimedia stream is encrypted using a key that is based on at least some of the content in the base layer.

Figure 6:
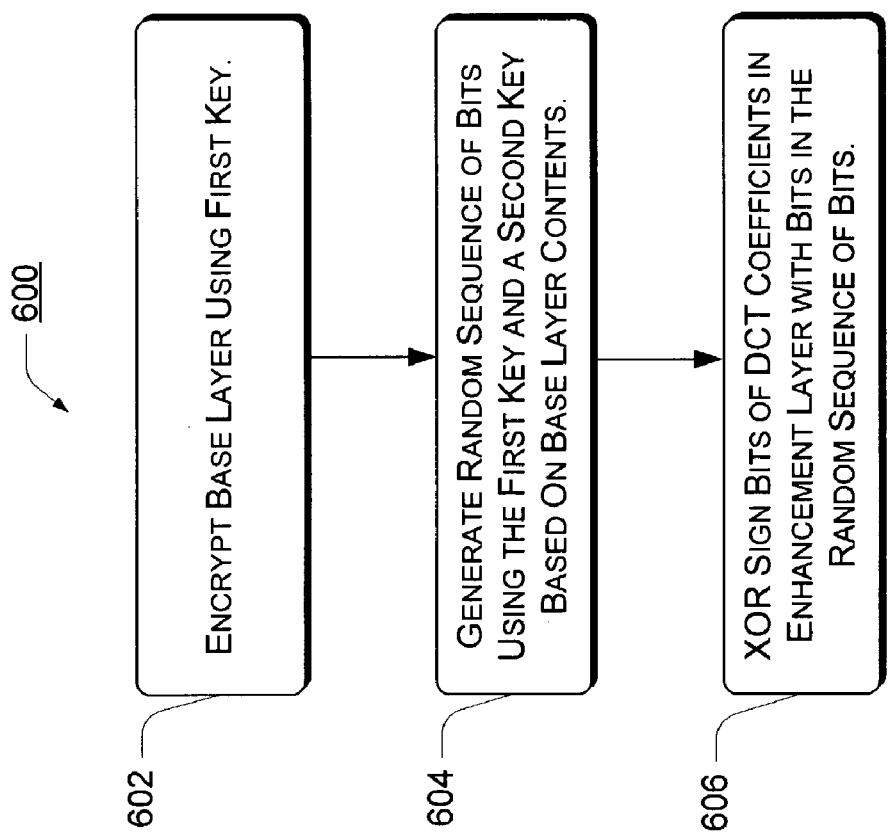
FIG. 6 is a flow diagram of another exemplary scalable encryption method.

FIG. 6 shows another exemplary scalable encryption method 600. This exemplary scalable encryption method 600 can be performed by a device, such as the exemplary encryption engine 204 shown in FIGS. 2 and 3. In the flow diagram, the operations are summarized in individual blocks. The operations may be performed in hardware and/or as machine-readable instructions (software or firmware) that can be executed by a processor.

At block 602, a base layer of a scalable multimedia stream is encrypted using a first key.

At block 604, a random or pseudo-random sequence of bits is generated using the first key and a second key derived at least in part from some of the base layer content. The first key is typically a global key for the entire multimedia stream being encrypted and the second key is typically a base layer key for encrypting just the enhancement layer of the current frame, or, FGST VOPs that refer to the base layer of the current frame.

At block 606, sign bits of DCT coefficients in the enhancement layer are XORed with bits from the random sequence of bits.

Security of the Exemplary Encryptions

Both visual effect and system security are factors in the security imparted by a multimedia encryption method. Visual effect pertains to how much useful information a user can derive from an encrypted multimedia stream. System security pertains to the amount of resistance an encrypted stream presents to passive and active attacks.

Regarding security, unlike text encryption, multimedia encryption may contain strong correlation in the plaintext video that an attacker can exploit. An attack on multimedia encryption might require only partial or approximate reversal of the encryption to be successful, whereas a successful attack on text encryption usually requires that the encryption of part or all of the entire text be completely reversed. Put another way, in an encrypted video not every part of the data in and between video frames is relevant so that approximate recovery of the original video may produce a good deal of information from the encrypted stream. Various applications have different criteria for security failure.

In contrast to the exemplary full encryption described above, the exemplary selective encryption for the base layer 106 described above leaves some visible structure in the encrypted multimedia content 210. The human eye can tell the difference between static parts and moving parts. The above-described exemplary full encryption method, on the other hand, removes almost all visually discernable structure from the encrypted multimedia content 210. The exemplary fully encrypted multimedia content 210 that includes a fully encrypted base layer 212 and a selectively encrypted enhancement layer 214 visually appears random and useless unless decrypted.

Both the exemplary scalable full encryption mode and the exemplary scalable selective encryption mode are robust to known plaintext attack since encryption of each frame is different because of the content dependent input (e.g., the base layer key 310) fed into the base layer cipher 304 and/or the enhancement layer cipher 314. Robustness to other types of attack varies between the selective and full encryption modes. For the exemplary scalable full encryption mode, the amount of security depends on the underlying algorithm used in the base layer cipher 304 for encryption. If the exemplary C&S technique is used, it provides a secure encryption. The exemplary scalable selective encryption mode, on the other hand, may be less secure, due to a limited number of states used.

The bits selected for encryption can have an effect on the amount of security achieved. For example, encryption of DC coefficients alone leaves edges of an encrypted frame still visually discernable. Encryption of sign bits for AC coefficients can be performed only on non-zero AC coefficients. In the case of motion vectors, since the number of motion vectors for a frame is limited, encryption on these sign bits is not very secure under a brute force attack. Encryption on motion vector residues does not add much security either since the number of bits used for motion vector residue is usually very small (e.g., two bits per frame). i.e., a correctly or incorrectly rendered motion vector residue does not cause much change or perceptual damage.

In some implementations, the exemplary selective encryption, although offering full compatibility with some scalable schemes such as MPEG-4 FGS, offers only lightweight security. Since many multimedia streams 102 are for use in entertainment applications, however, in which the rendered video usually has low informational value, the exemplary selective encryption provides speed and scalability while costing an attacker more to decrypt the video than to legally purchase a copy of the video. Thus, the exemplary selective encryption is a viable solution for many applications.

Experimental Results

At least part of the exemplary encryption engine 204 has been implemented in pure C++ code. Tests were performed using the exemplary encryption engine 204 on a PENTIUM® III 667 megahertz DELL® PC with 512 megabytes of memory. (PENTIUM® III is a mark of INTEL®R Corporation, Santa Clara, Calif.) (DELL® Computer Corporation, Austin, Tex.).

Figure 7:
FIG. 7 is a set of video images showing exemplary scalable full encryption and exemplary scalable selective encryption.

FIG. 7 shows a visual rendering 700 of a scalable multimedia stream before and after exemplary scalable encryption. Frames of original video images 702, 702' depict the multimedia content 102 before processing by the exemplary encryption engine 204. Selectively encrypted video images 704, 704' depict the encrypted multimedia content 210 after exemplary selective encryption but before decryption. The selectively encrypted video images 704, 704' contain some recognizable video objects 706 but for practical viewing purposes are too scrambled for a clear, comprehensible, and enjoyable viewing. Fully encrypted video images 708, 708' depict the encrypted multimedia content 210 after exemplary full encryption but before decryption. The fully encrypted video images 708, 708' appear as random shapes and patterns spread across the field of view and are useless for practical viewing purposes. It should be noted once again that the encrypted multimedia content 210, whether encrypted with the exemplary scalable full encryption or the exemplary scalable selective encryption, maintains full functionality of MPEG-4 FGS and FGST scalability features as described above.

CONCLUSION

The foregoing describes an exemplary encryption engine and related methods for fully scalable encryption of scalable multimedia. The subject matter described above can be implemented in hardware, in software, or in both hardware and software. In certain implementations, the exemplary encryption engine and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method, comprising:
receiving scalable multimedia content having a base layer and an enhancement layer;
encrypting content of the base layer using a first scheme;
encrypting content of the enhancement layer using a second scheme; and
wherein the first scheme includes deriving a base layer key from at least some of the content of the base layer and the second scheme includes encrypting the content of the enhancement layer using the base layer key.

2. The method as recited in claim 1, wherein if the content of the base layer or the content of the enhancement layer is at least one individual object, then the at least one individual object is selected from a group of individual objects consisting of a frame, a video object plane, a packet, a payload, an individual object comprising several consecutive frames, an individual object comprising several video object planes, an individual object comprising several packets, an individual object comprising several payloads, and an individual object comprising an entire content of the base layer or the enhancement layer.

3. The method as recited in claim 1, wherein a chain and sum (C&S) encryption technique is used to produce the base layer key from at least some of the content of the base layer.

4. The method as recited in claim 3, wherein the C&S encryption includes replacing DES encryption of the pre-message authentication code with RC5 encryption.

5. The method as recited in claim 2, further comprising selectively encrypting the base layer, wherein selectively encrypting includes encrypting only one or more bit sets from each frame of the base layer, wherein a bit set is selected from a group of bit sets in the frame consisting of discrete cosine values of intra_dc_coefficient bits, discrete cosine values of dct_dc_differential bits, sign bits of discrete cosine transformation coefficients, sign bits of motion vectors, and sign bits of motion vector residues.

6. The method as recited in claim 2, wherein the first scheme includes encrypting the base layer using a global key and the second scheme includes encrypting the enhancement layer using the global key and the base layer key, wherein the global key and the key derived from base layer content are input to a cipher to produce a sequence of bits to XOR with sign bits of discrete cosine transformation coefficients in the enhancement layer.

7. The method as recited in claim 6, further comprising XORing an array of bits from the sequence of bits with a corresponding array of sign bits of discrete cosine transformation coefficients from a frame of the enhancement layer to produce a selectively encrypted enhancement layer.

8. The method as recited in claim 7, further comprising XORing an array of bits from the sequence of bits with a corresponding array of sign bits of discrete cosine transformation coefficients from a frame of the base layer to produce a selectively encrypted base layer.

9. The method as recited in claim 2, wherein the second scheme includes leaving at least some of the enhancement layer unencrypted.

10. The method as recited in claim 9, wherein the encrypting of the content of the base layer uses a stream cipher.

11. The method as recited in claim 10, wherein the stream cipher is an RC4 encryption technique.

12. The method as recited in claim 10, wherein the first scheme includes deriving a base layer key from at least some of the content of the base layer and if any content of the enhancement layer is to be encrypted then encrypting the content of the enhancement layer using the base layer key.

13. The method as recited in claim 12, wherein a chain and sum (C&S) encryption technique is used to produce the base layer key from at least some of the content of the base layer.

14. The method as recited in claim 13, wherein the C&S encryption technique is replaced at least in part by a block cipher.

15. The method as recited in claim 14, wherein the block cipher is one of DES, AES, and RC5.

16. The method as recited in claim 15, wherein the block cipher uses one of an electronic codebook mode (ECB), a block chaining mode (CBC), or an offset codebook (OCB) mode.

17. The method as recited in claim 13, wherein the C&S encryption includes replacing DES encryption of the pre-message authentication code with RC5 encryption.

18. The method as recited in claim 13, wherein the C&S encryption includes replacing DES encryption of the pre-message authentication code with AES encryption.

19. The method as recited in claim 13, wherein the C&S encryption uses a reversible message authentication code to replace part of data in the content to be encrypted.

20. The method as recited in claim 19, wherein the message authentication code and an encryption key are used with a stream cipher to encrypt the data.

21. The method as recited in claim 20, wherein a stream cipher key depends on both the encryption key and a hash value of the data to be encrypted.

22. The method as recited in claim 9, wherein the scalable multimedia content is a bitstream conforming to an MPEG-4 fine granuisrity scalability profile, a SMART scalable bitstream, or a SMART++ scalable bitstream.

23. The method as recited in claim 9, further comprising encrypting the content of the base layer using a global key and encrypting the content of the enhancement layer using the global key and the base layer key.

24. The method as recited in claim 23, wherein the base layer key includes a hash value based on at least some of the content of the base layer to be encrypted.

25. The method as recited in claim 23, wherein the base layer key comprises a sum of hash values based on at least some of the content of the base layer to be encrypted.

26. The method as recited in claim 25, wherein the sum of hash values comprises at least part of a pre-encrypted message authentication code (pre-MAC) for at least some of the base layer content to be encrypted.

27. The method as recited in claim 26, wherein the pre-encrypted MAC replaces part of content of the base layer to prevent an increase in a data size of the base layer.

28. The method as recited in claim 27, wherein the pre-encrypted MAC is reversible, wherein reversibility allows an encrypted MAC to be decrypted into the pre-encrypted MAC to obtain original content of the base layer.

29. The method as recited in claim 28, wherein the pre-encrypted MAC is encrypted using a block cipher such as DES, AES, RC5 encryption technique and remaining content of the base layer is encrypted using a stream cipher.

30. The method as recited in claim 29, wherein the stream cipher is an RC4 encryption technique.

31. The method as recited in claim 9, further comprising fully encrypting the content of the base layer, wherein fully encrypting includes encrypting all entropy-coded multimedia data in the base layer, except object headers.

32. The method as recited in claim 31, further comprising encrypting all entropy-coded multimedia data in the base layer except object headers using chain and sum encryption for each frame of the base layer.

33. The method as recited in claim 9, further comprising selectively encrypting the base layer, wherein selectively encrypting includes encrypting only one or more bit sets from each frame of the base layer, wherein a bit set is selected from a group of bit sets in the frame consisting of discrete cosine values of ultra_dc_coefficient bits, discrete cosine values of dct_dc_differential bits, sign bits of discrete cosine transformation coefficients, sign bits of motion vectors, and sign bits of motion vector residues.

34. The method as recited in claim 9, wherein the first scheme includes encrypting the base layer using a global key and if at least some of the enhancement layer is to be encrypted then encrypting the enhancement layer using the global key and the base layer key, wherein the global key and the key derived from base layer content are input to a cipher to produce a sequence of bits to XOR with sign bits of discrete cosine transformation coefficients in the enhancement layer.

35. The method as recited in claim 34, wherein the sequence of bits is a random or pseudo-random sequence.

36. The method as recited in claim 34, further comprising XORing an array of bits from the sequence of bits with a corresponding array of sign bits of discrete cosine transformation coefficients from a frame of the enhancement layer to produce a selectively encrypted enhancement layer.

37. The method as recited in claim 36, further comprising XORing an array of bits from the sequence of bits with a corresponding array of sign bits of discrete cosine transformation coefficients from a frame of the base layer to produce a selectively encrypted base layer.

38. The method as recited in claim 37, further comprising using a different sequence of bits for encrypting the enhancement layer than for encrypting the base layer.

39. The method as recited in claim 36, further comprising XORing an my of bits from the sequence of bits with a corresponding my of temporal video object plane motion vectors from a frame of the enhancement layer to produce the selectively encrypted enhancement layer.

40. The method as recited in claim 39, wherein the temporal video object plane motion vectors conform to an MPEG-4 fine granularity scaiability profile having temporal scalability or a SMART or a SMART++ scalable bitstream.

41. The method as recited in claim 39, further comprising adding a frame count to each object header and using the frame counts as input to the cipher to produce the sequence of bits.

* * * * *

UNITED STATES PATENT AND TRADEMARK OFFICE
CERTIFICATE OF CORRECTION

PATENT NO. : 7,406,176 B2
APPLICATION NO. : 10/405970
DATED : July 29, 2008
INVENTOR(S) : Bin Zhu et al.

It is certified that error appears in the above-identified patent and that said Letters Patent is hereby corrected as shown below:

In column 13, lines 53-54, in Claim 2, delete "obj ect" and insert -- object --, therefor.

In column 15, line 3, in Claim 22, delete "granuisrity" and insert -- granularity --, therefor.

In column 16, line 2, in Claim 33, delete "ultra" and insert -- intra --, therefor.

In column 16, line 30, in Claim 39, delete "my" and insert -- array --, therefor.

In column 16, line 31, in Claim 39, delete "my" and insert -- array --, therefor.

In column 16, line 36, in Claim 40, delete "scaiability" and insert -- scalability --, therefor.

Signed and Sealed this
Third Day of May, 2011

David J. Kappos
*Director of the United States Patent and Trademark Office*